(12) United States Patent
Aagaard et al.

(10) Patent No.: US 6,839,576 B2
(45) Date of Patent: Jan. 4, 2005

(54) MULTIPLE AXIS HINGE ASSEMBLY

(75) Inventors: Karsten Aagaard, St. Charles, IL (US); Vialty Lenchik, Lake Zurich, IL (US); John Haley, Channahon, IL (US)

(73) Assignee: Motorola, Inc., Schaumburg, IL (US)

( * ) Notice: Subject to any disclaimer, the term of this patent is extended or adjusted under 35 U.S.C. 154(b) by 198 days.

(21) Appl. No.: 10/331,295

(22) Filed: Dec. 30, 2002

(65) Prior Publication Data

US 2004/0127266 A1 Jul. 1, 2004

(51) Int. Cl.⁷ .................................. H04B 1/38
(52) U.S. Cl. .............................. 455/575.1; 455/575.3; 455/90.3
(58) Field of Search ........................ 455/575.1, 575.3, 455/575.8, 90.3, 550.1, 575.4; 379/433.13; D14/137, 138; 345/164

(56) References Cited

U.S. PATENT DOCUMENTS

| | | | |
|---|---|---|---|
| 872,694 A | | 12/1907 | Thiem |
| 4,086,519 A | | 4/1978 | Persson |
| 6,009,336 A | | 12/1999 | Harris et al. |
| 6,266,236 B1 | * | 7/2001 | Ku et al. ............... 361/681 |
| 6,549,789 B1 | * | 4/2003 | Kfoury ................. 455/550.1 |
| 6,658,272 B1 | * | 12/2003 | Lenchik et al. ......... 345/164 |
| 6,728,557 B1 | * | 4/2004 | Tracy et al. ............ 455/575.3 |
| 6,766,181 B1 | * | 7/2004 | Newman et al. ........ 455/575.3 |
| 2004/0067783 A1 | * | 4/2004 | Lenchik et al. ......... 455/575.1 |
| 2004/0110529 A1 | * | 6/2004 | Watanabe et al. ....... 455/550.1 |
| 2004/0127266 A1 | * | 7/2004 | Aagaard et al. ......... 455/575.1 |
| 2004/0137940 A1 | * | 7/2004 | Matsunami ............. 455/550.1 |

* cited by examiner

Primary Examiner—Lester G. Kincaid
Assistant Examiner—Raymond B. Persino
(74) Attorney, Agent, or Firm—Roland K. Bowler, II; Matthew C. Loppnow; David S. Noskowicz

(57) ABSTRACT

A self configuring multiple element portable electronic device (100) and method is provided. The device comprises at least a first electronic element (104) and a second electronic element (106) and a joint (112) connecting the first electronic element and the second electronic element, with the joint allowing movement in more than one plane of the first electronic element in relation to the second electronic element, wherein the self configuring multiple element portable electronic device is capable of self configuring an operational mode based on a relative position of the first electronic element with respect to the second electronic element. The first housing has a first retaining member (1406) which is engageable to a second retaining member (1408) of the second housing. The method comprises the steps of detecting a relative position of the first electronic element relative to the second electronic element, and selecting an operational mode of the device based on the relative position.

18 Claims, 10 Drawing Sheets

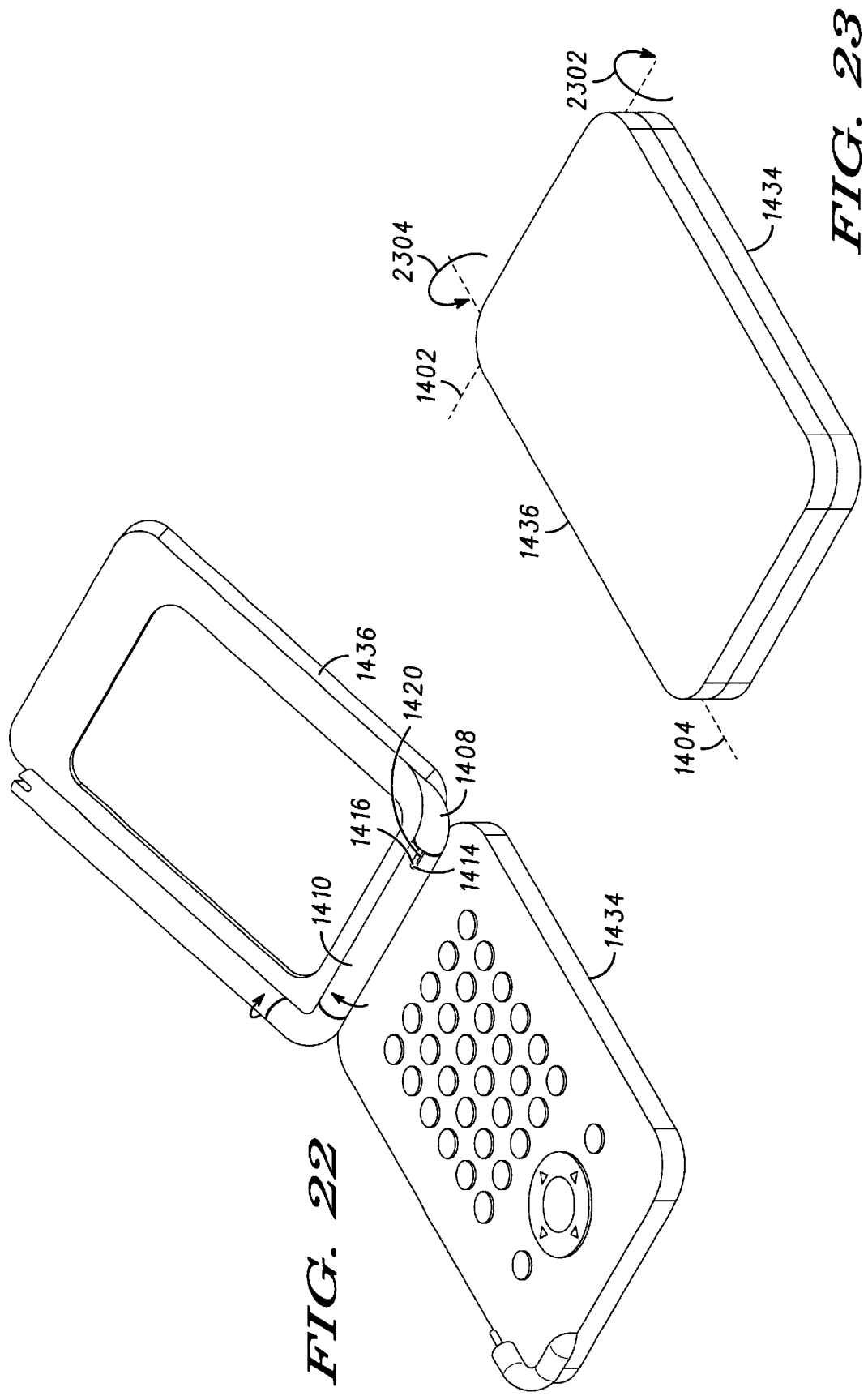

MULTIPLE AXIS HINGE ASSEMBLY

BACKGROUND OF THE INVENTION

The present invention relates generally to portable electronic devices, and more particularly to portable electronic devices having multiple elements.

Many portable electronic devices exist that are designed for making life easier and more productive. Devices such as cellular phones, pagers, and personal digital assistants (PDAs) perform valuable functions such as communications, messaging, data storage and recall, etc.

These portable electronic devices often have two parts, a hinged cover having a display and a body having a keyboard. The display is typically chosen to match the intended purpose. For example, PDAs typically have a relatively large display, useful for displaying text and graphics. Cellular phones, on the other hand, typically have smaller displays designed for displaying a limited number of alphanumeric characters. This makes sense, as production costs may be kept down by including only the required capabilities in the device.

More and more, people find such portable electronic devices to be invaluable for keeping in touch with co-workers, family and friends, and for organizing a busy lifestyle. As the demand for portable electronic devices increases, these devices tend to increase in functions, features and complexity. However, such devices still tend to remain as distinct units due to the increased complexity and difficulty of use that often comes with integration of multiple devices.

Integration of multiple devices is understandably difficult, due to the need for providing different functions that intermesh operationally while sharing inputs, outputs, and other resources. This is further complicated by the need to create a device that is intuitively simple to use.

Non-integration of portable electronic devices produces several drawbacks. First, there are the obvious drawbacks such as needing multiple devices to accomplish all desired functions, along with the attendant size and weight inconvenience. Second, non-integration means that multiple devices have duplicate components, such as heavy and bulky displays, input devices, and power sources. Third, the increased use of microprocessors and their increasing capabilities allow devices to be developed that are flexible and can be configured to perform multiple functions. Fourth, integrating devices to share common components and to cooperatively function could provide increased value to consumers while reducing prices.

There remains a need in the art, therefore, for improvements in portable electronic devices.

BRIEF DESCRIPTION OF THE DRAWINGS

FIG. 22 shows an exemplary view of the device in an open position; and

FIG. 23 shown an exemplary view of the device in the closed position.

DETAILED DESCRIPTION OF THE PREFERRED EMBODIMENTS

Figure 1:
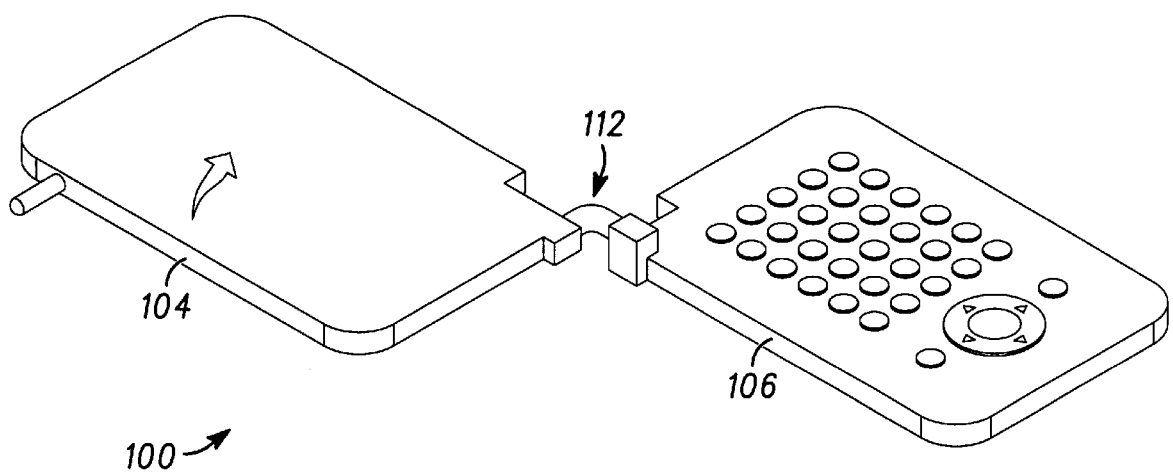
FIGS. 1–8 show an exemplary view of the self-configuring multiple element wireless portable electronic communication device having a first element joined to a second element by a joint.
Figure 2:
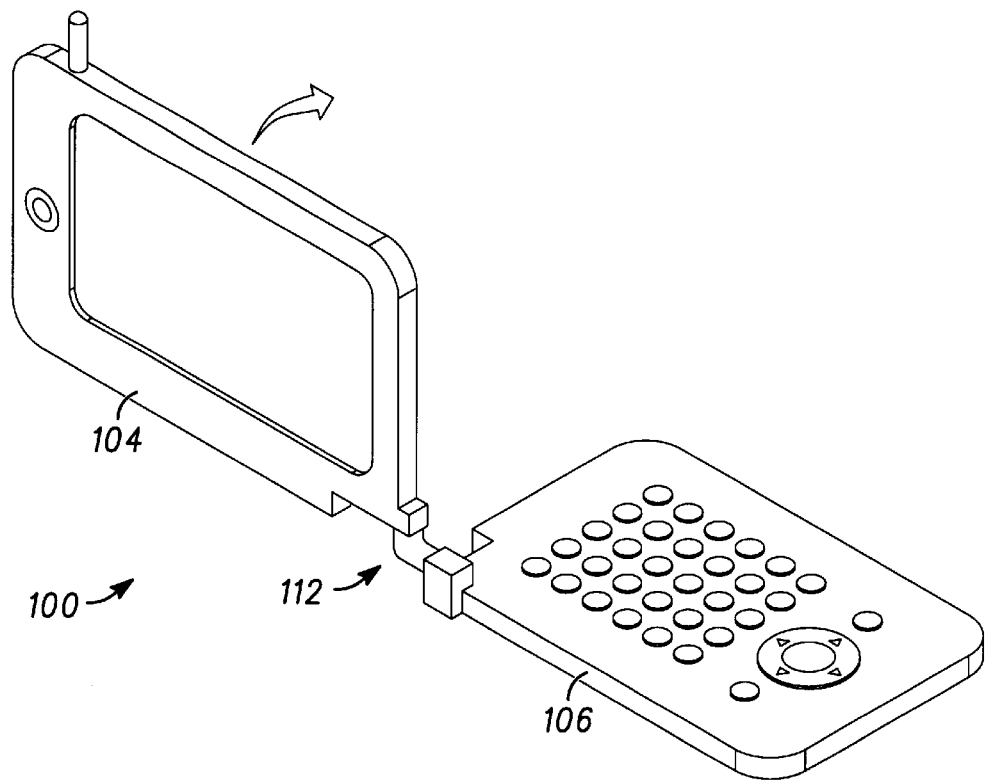

A multiple element wireless portable electronic communication device is described. The device comprises at least a first housing portion and a second housing portion and a joint connecting the first housing portion and the second housing portion, with the joint allowing movement in more than one plane of the first housing portion in relation to the second housing portion, wherein the multiple element portable electronic device may be capable of self configuring an operational mode based on a relative position of the first housing portion with respect to the second housing portion. The housing portions further comprise retaining portions that allow the two housing portions to rotate about one axis at a time.

The device comprises at least a first housing portion and a second housing portion, a hinge connecting said first housing portion and said second housing portion, a first retaining portion protruding from said second housing portion, and a second retaining portion of said first housing portion. The first retaining portion is perpendicular to the second axis and is cylindrical in shape. The end of the first retaining portion may be rounded instead of flat, however the outer surface of the cylinder is substantially round. The second retaining portion has a first notch forming a first opening in the first housing portion which is perpendicular to the second axis, and adapted to receive said first retaining portion when said first opening of said first notch is in a plane substantially parallel to the plane of said second axis. The hinge allows rotation of the first housing portion relative to the second housing portion about a first axis, and the hinge allowing rotation of said first housing portion relative to said second housing portion about a second axis perpendicular to said first axis. The self configuring multiple element portable electronic device is capable of self configuring an operational mode based on a relative position of the first housing portion with respect to the second housing portion.

A method for self configuring an operational mode in a self configuring multiple element wireless portable electronic communication device having a first housing portion that may be moved in relation to a second housing portion is provided according to a third aspect of the invention. The method comprises the steps of detecting a relative position of the first housing portion relative to the second housing poriton, and selecting an operational mode of the device based on the position.

Now turning to FIGS. 1–8 show a self-configuring multiple element wireless portable electronic communication device 100 having a first housing portion 104 joined to a second housing poriton 106 by a joint 112. FIGS. 1–4 show a configuration sequence wherein the first housing portion 104 and the second housing portion 106 are manipulated to place the device 100 into a portrait configuration.

Figure 4:
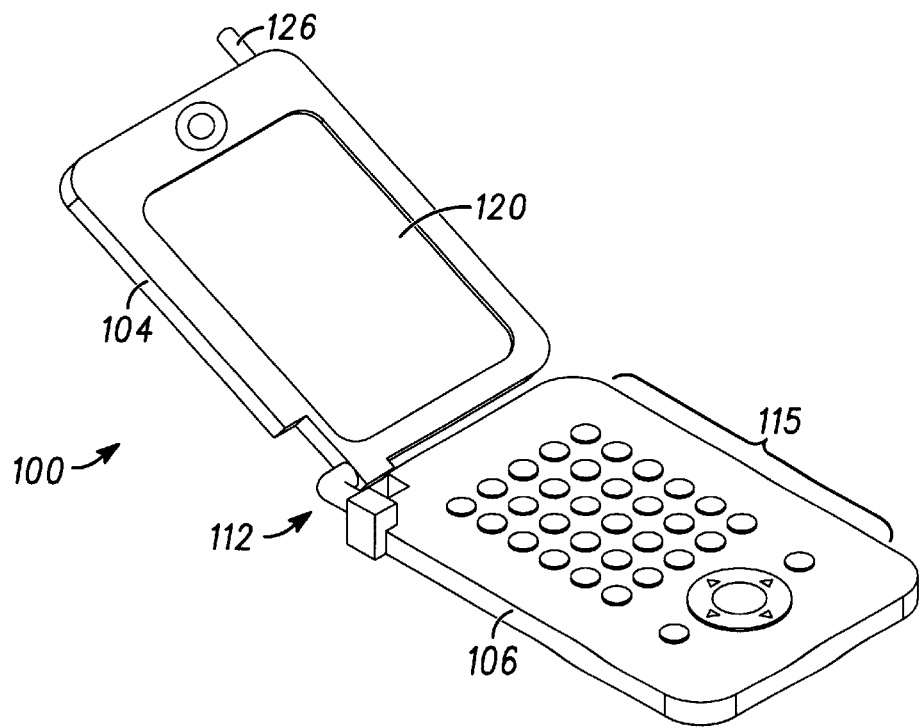
Figure 5:
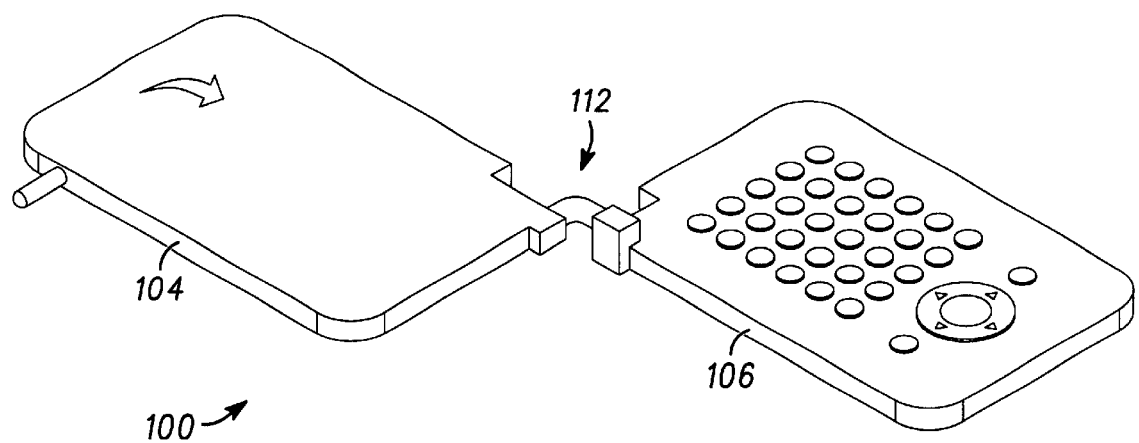
Figure 6:
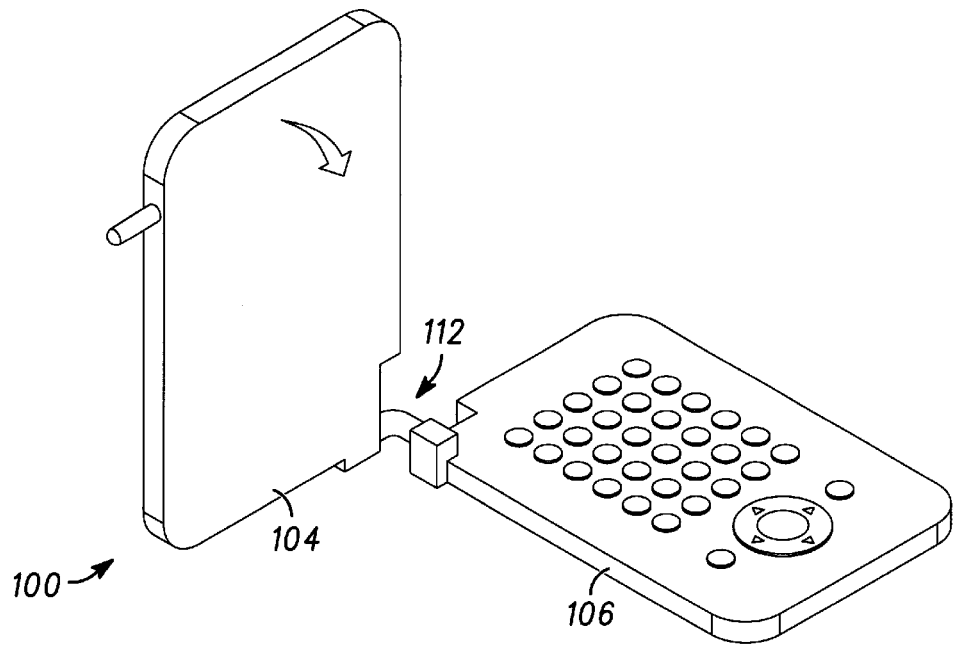

FIG. 4 shows a self-configuring device 100 when it is configured in a portrait configuration such as, for example, a cellular phone. A long dimension of the typically rectangular display 120 is vertically (or longitudinally) positioned when in use. Because the display 120 is therefore positioned like a portrait of a person, it is known as a portrait mode. The portrait configuration is also reflected in the inputs 115 of the second housing portion 106, which may be configured to reflect the portrait mode and may include numeric keys and other phone keys. The first housing portion 104 may be rotated down to a closed position parallel to and in contact with the second housing portion 106 to assume a closed configuration (not shown). This is typical of a cellular phone wherein a body and a lid may be folded together and closed during non-use.

FIGS. 5–8 show a configuration sequence wherein the first housing portion 104 and the second housing portion 106 are manipulated to place the device 100 into a landscape configuration.

Figure 8:
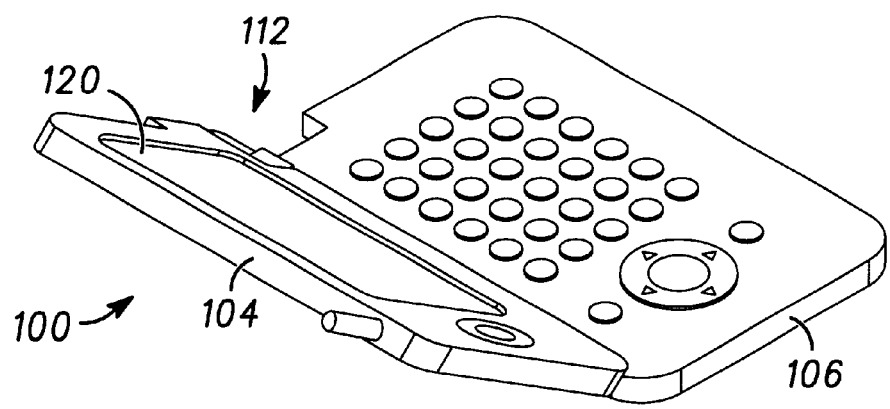

FIG. 8 shows the self-configuring multiple element portable electronic device 100 in a landscape configuration, such as, for example, a pager. In the landscape configuration, the display 120 has the long dimension in a substantially lateral position, as is the second housing portion 106. This may also be appropriate for a device such as a PDA or other electronic appliances. Again, the first housing portion 104 may be rotated down to a closed position parallel to and in contact with the second housing portion 106 to assume a closed configuration (not shown).

Figure 9:
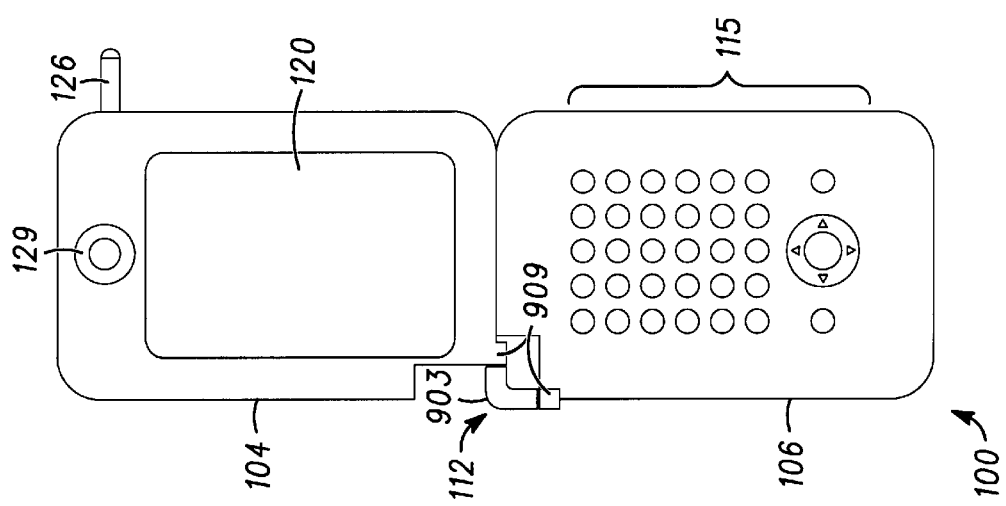
FIG. 9 shows exemplary views of various input and output devices and other features.

Referring now to FIG. 9, the various input and output devices and other features are discussed. In a typical configuration, the first housing portion 104 contains a display 120. The display 120 may be any common display device, such as an LCD screen, a fluorescent display, a TFT display, or a CRT, for example. The display 120 in a cellular phone type configuration may be used to display phone related functions such as name and number storage, speed dial information, or phone control and operation settings, for example. In pager or PDA type operational modes, the display 120 may be used to provide a variety of graphics, images, text, or combinations thereof. The orientation of the display 120 may be self configured by the device 100 to match the overall orientation of the self-configuring multiple element portable electronic device 100.

Also included in the first housing portion 104 may be an antenna 126 and a camera 129. The camera 129 is preferably a video camera, but alternatively may be a still digital camera. The antenna polarization may be modified to reflect the configuration (i.e., a horizontal polarization in the portrait mode and a vertical polarization in the landscape mode, for example).

The second housing portion 106 may contain inputs 115 such as, for example, a keyboard. Alternatively, other input devices (not shown) may include a pointing device such as a joystick and buttons used on laptop or notebook computers, a track ball, a touch pad, a rocker switch, a touch screen, a TTY input device for disable persons, a Braille key input, or a pad for handwriting pen, for example. The orientation of the inputs 115 will be self configured to match the overall orientation of the self-configuring multiple element portable electronic device 100.

The joint 112 joins the first housing portion 104 to the second housing portion 106 and allows the first housing portion 104 to move with respect to the second housing portion 106. This movement may be in two planes, unlike a typical cellular phone which consists of a body with a hinged cover that moves in only one plane.

Although the present invention is shown as having only two elements, or housings it should be understood that the present invention also applies to portable electronic devices having three or more elements. In such cases, multiple joints 112 may be employed.

The joint 112 may optionally include one or more detents wherein a detent position provides a bias to hold the first housing portion 104 in a predetermined position in relation to the second housing portion 106. Two such detents are preferably located to provide the relative positions shown in FIGS. 4 and 8.

It can be seen from the figures that the joint 112 allows the first housing portion 104 and the second housing portion 106 to move with respect to each other, allowing various positions of the two housing portions. The joint 112 of the present invention also allows the device 100 to sense the relative positions of the first housing portion 104 and the second housing portion 106. Because of this ability to determine the relative positions, both the display device 120 and the inputs 115 may be configured by the portable electronic device 100 into either a landscape mode or a portrait mode.

In addition to the changing of the orientation of displayed graphics or text, the orientation and arrangement of the individual keys or input elements of the inputs 115 may also be modified. For example, in a portrait (cellular phone) mode the input keys may be arranged so that they are properly oriented when the portable electronic device 100 is in a vertical portrait position (see FIG. 4). In the landscape mode, the first housing portion 104 and second housing portion 106 are substantially parallel and horizontally positioned, and the input keys may be configured in a horizontal orientation (see FIG. 8).

Although FIGS. 1–8 show both configurations starting from a similar initial configuration, it should be noted that the device 100 may be directly manipulated from one configuration to the other, without necessarily having to proceed to the configuration shown in FIG. 1.

The input keys may be reoriented by simply including multiple symbols or characters on each key (oriented in both portrait and landscape positions). Alternatively, the inputs 115 may include a touch-screen display that is capable of reconfiguring and reorienting the touch input regions and accompanying symbols and characters. A third alternative is the use of controllable backlighting, wherein symbols or characters are variably illuminated in a translucent or transparent input element or key. A fourth alternative is the use of electronic labels which contain symbols or characters that can be reconfigured and reoriented.

Likewise, other input and output devices, such as the camera 129 or an electronic handwriting tablet for use with a handwriting stylus, for example, may be self configured by the relative positions of the first housing portion 104 and the second housing portion 106. In addition the operation of the input device must have the proper orientation. Handwriting recognition software must know whether the handwriting tablet is in a landscape or portrait positions. The same is true for joysticks and other similar devices.

As an additional feature, the relative positions of the housing portions may also select a service to be received.

For example, the user may position the two housing portions 104 and 106 to cause the portable electronic device 100 to self configure as a cellular phone and receive incoming phone calls. The portable electronic device 100 may include an alert that notifies the user that a non-selected service is waiting to be received, such as an incoming page in this example. The user may therefore reposition the housing portions of the device 100 in order to cause the device 100 to self configure as a pager, whereupon the incoming page may be received and/or responded to.

As a further feature, altering the operational configuration and mode of the device 100 may be useful in conserving battery life. Some operational modes, chosen by the user, may consume less battery life, given screen activity, screen size, or non real-time synchronous message versus real-time messaging (i.e., paging versus telephony). The operation modes may also dictate different reverse channel transmit power levels, also allowing for battery life conservation.

Figure 3:
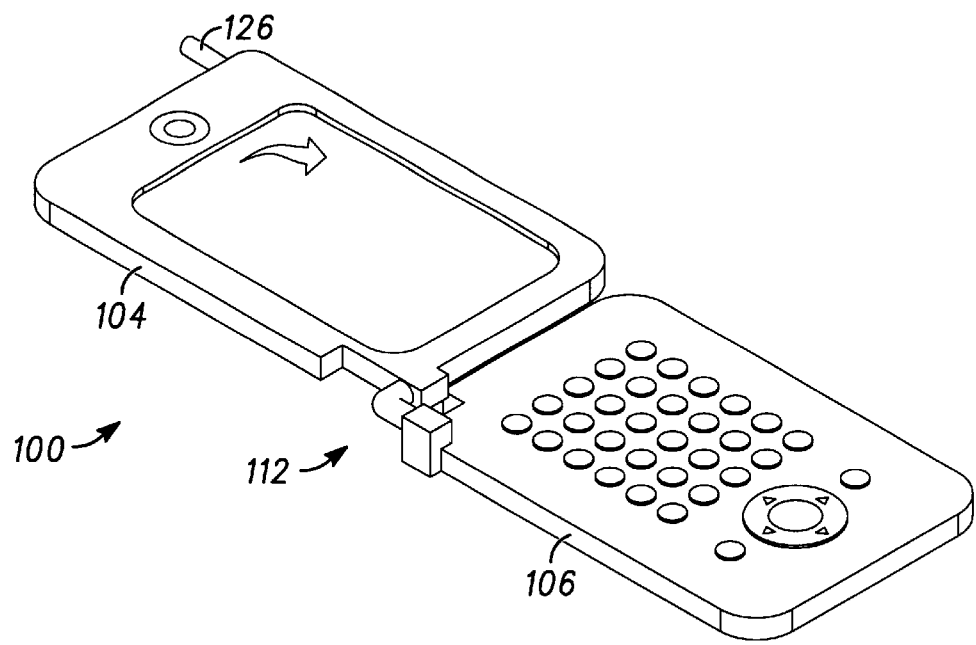
Figure 7:
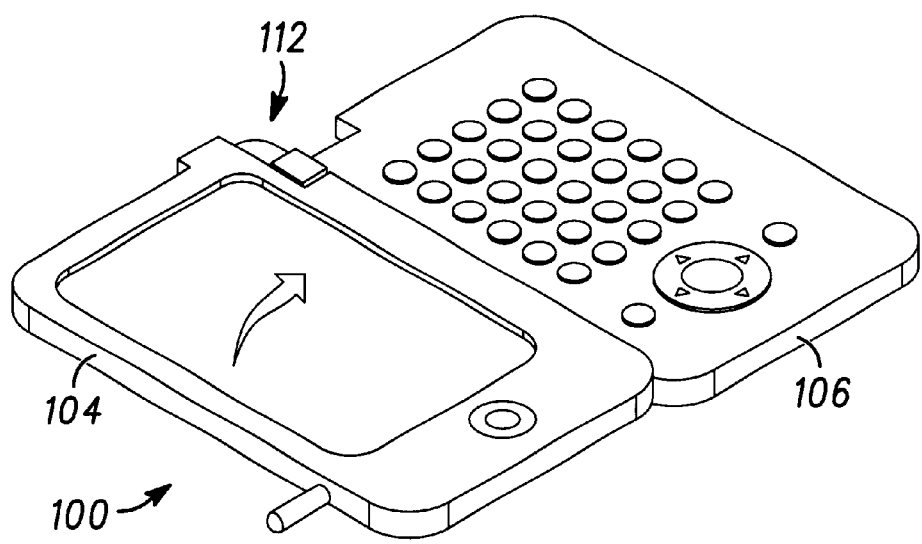

Still further, altering the configuration and operation mode of the device results in the need to align the antenna for optimum RF operation, typically in a vertical polarization. As shown in FIG. 7, when the device is configured in a landscape orientation the antenna will need to be in a first position extending the antenna in a optimum RF polarization as the device is operated by the user. FIG. 3 shows operation of the device configured in a portrait orientation, such as a cellular phone.

FIG. 9 shows detail of a first exemplary embodiment of the joint 112 of the present invention. The joint 112 includes a first fixed element 909 attached to the first housing portion 104, a second fixed element 911 attached to the second housing portion 106, and a connector element 903. The connector element 903, or elbow, rotatably attaches to and connects the two fixed elements 909 and 911, and allows the first housing portion 104 to rotate in two planes with respect to the second housing portion 106.

Figure 10:
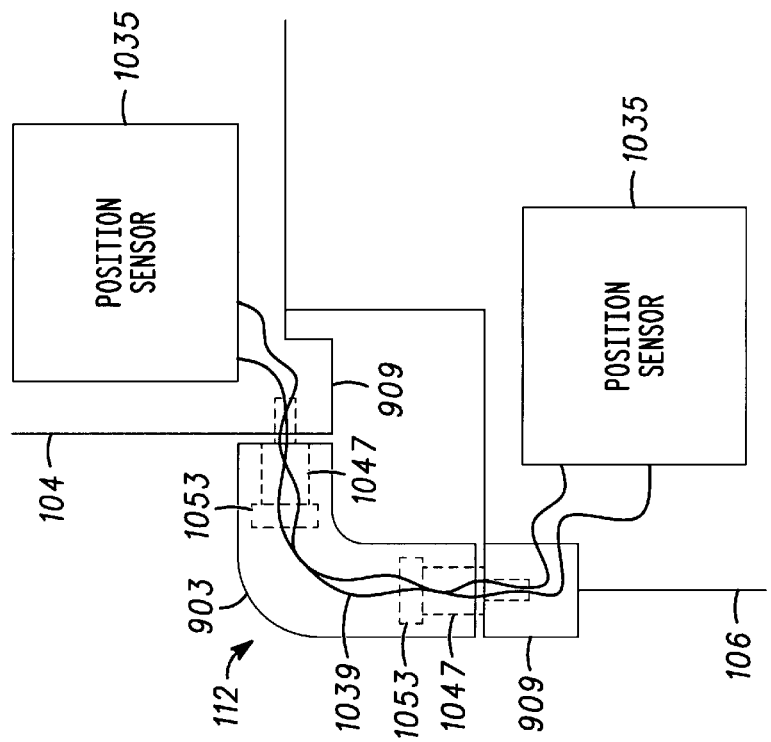
FIG. 10 shows an exemplary first joint embodiment along with a positional sensor device arrangement.

FIG. 10 shows the first joint embodiment along with a positional sensor device arrangement. Exemplary fixed elements 909 and 911 include a shaft 1047. A fixed element 909, 911 is affixed to the first and second electronic housing portions 104 and 106, while the shaft 1047 is adapted to fit rotatably within an opening in the connector element 903. The fixed elements 909, 911 (or the connector element 903) may include a retainer device, such as the ridge or ring 1053, for example, that allows the components to securely snap together.

The joint 900 may include one or more positional detents. This may be a ridge (not shown) on the shaft 1047 which may interact with grooves, etc., in the connector element 903 to provide fixed positional detents.

The fixed elements 909, 911 each contain positional sensor devices (discussed below in conjunction with FIGS. 11–13) that interact with the connector element 903. The positional sensor devices are each connected to corresponding position sensor circuit boards 1035, and are therefore capable of determining a relative rotational position of each housing portion with respect to the connector element 903. When possessing data from both positions sensors and both position sensor circuit boards 1035, the portable electronic device 100 can determine a relative position of the first housing portion 104 with respect to the second housing portion 106.

Also shown in the figure is a bus 1039. The bus 1039 may pass through a hollow interior of the fixed elements 909, 911 and a hollow interior of the connector element 903, and may be a single wire or lead, or a plurality of wires or leads. A positional information from a position sensor may be transmitted over the bus 1039. In addition, the bus 1039 may conduct electrical power between the electronic elements. Alternatively, the data bus 1039 may be external to the three joint components.

Figure 11:
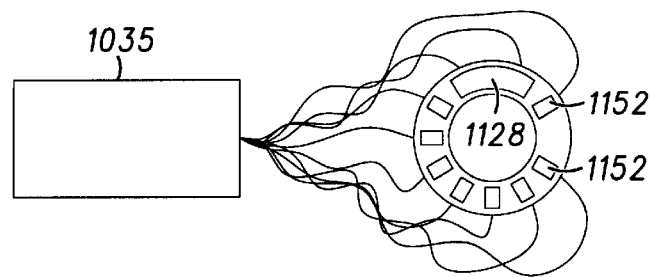
FIGS. 11–13 show various exemplary embodiments of a position sensor.
Figure 12:
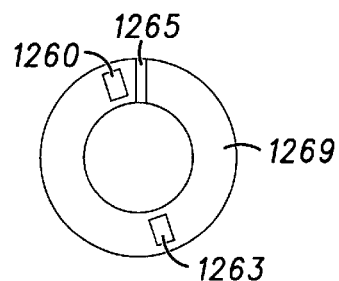
Figure 13:
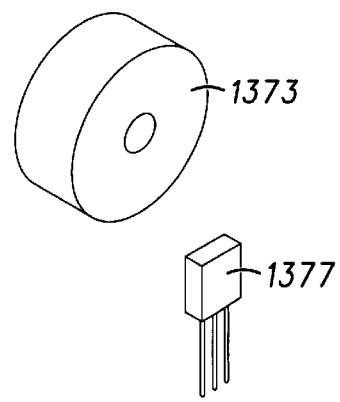

FIGS. 11–13 show various embodiments of the position sensor 932. FIG. 11 shows a first sensor embodiment wherein a face of a fixed element 909, 911 may include a plurality of position sensor contacts 1152. A contact 1128 on the connector element 903 (only the contact 1128 is shown for clarity) may bridge pairs of position sensor contacts 1152, giving the corresponding position sensor circuit board 1035 a closed electrical circuit that may be used to determine a relative position of an housing portion 104 or 106. Due to the design of this sensor embodiment, only one pair of position sensor contacts 1152 may form a closed circuit at any time.

FIG. 12 shows a second sensor embodiment, wherein the position sensor comprises a variable resistor. The position sensor includes a fixed contact 1260, a resistive surface 1269, and a gap 1265 in the resistive surface 1269, all formed on a fixed element 909, 911. A moving contact 1263 is affixed to the connector element 10003 (the connector element 903 is not shown for clarity). In use, the moving contact 1263 may rotate on the position sensor as the corresponding housing portion is moved. It should be understood that a wire or other lead must therefore extend from the moving contact 1263 to the position sensor circuit board 1035 (not shown). The resistance received by a corresponding position sensor circuit board 1035 will therefore vary according to the rotation of the position sensor.

The above description places the variable resistor on a fixed element 909, 911. However, the variable resistor could alternatively be formed on an end of the connector element 903, with the moving contact 1263 being formed on a fixed element 909, 911.

FIG. 13 shows a third sensor embodiment, wherein the position sensor comprises a magnet 1373 and a Hall Effect sensor 1377. The magnet 1373 is preferably affixed to an end of the connector element 903, and the Hall Effect sensor 1377 is affixed to or embedded in a fixed element 909. The magnet 1373 may be comprised of multiple magnetic north and south poles, and may be comprised of multiple magnets or magnetic poles of different strengths and orientations.

The Hall Effect sensor 1377 generates an electrical signal when in a magnetic field. The corresponding position sensor circuit board 1035 may use this electrical signal to determine a relative position.

Figure 14:
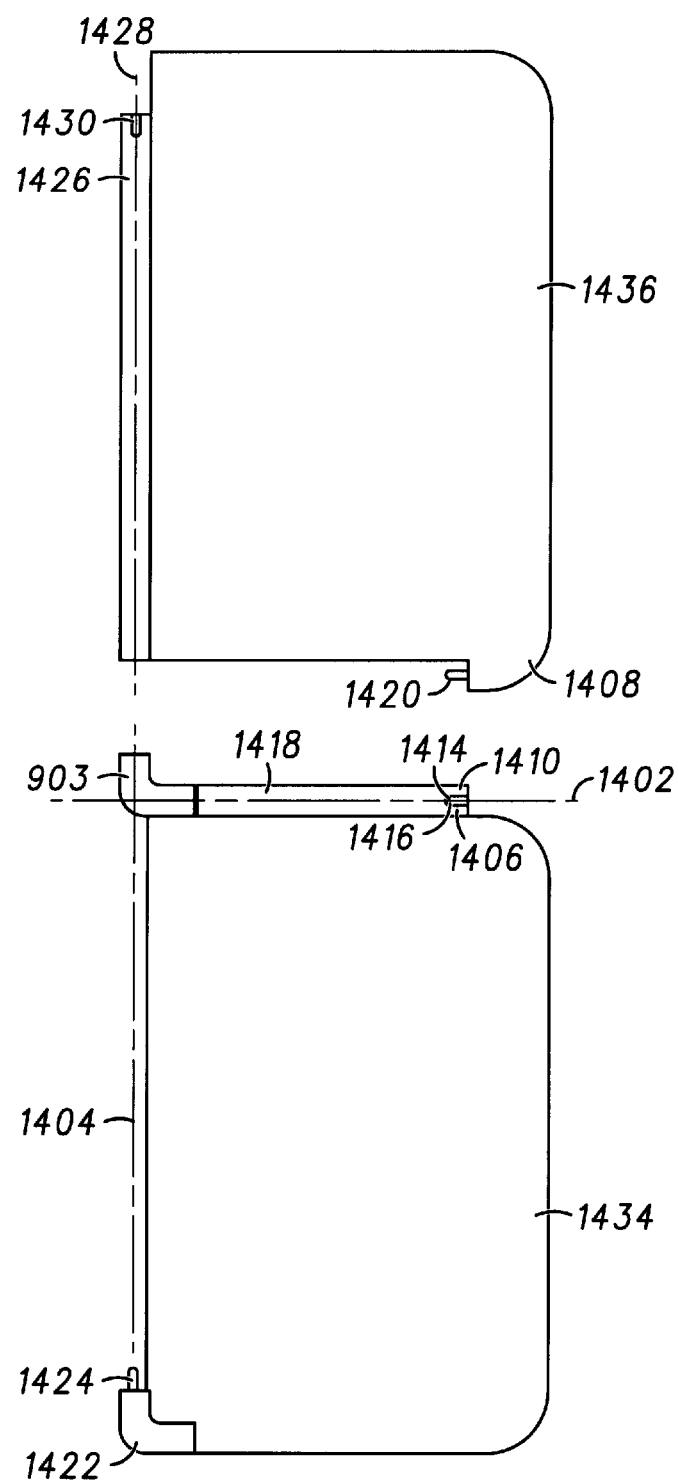
FIG. 14 shows an exemplary view of the coupling members.
Figure 15:
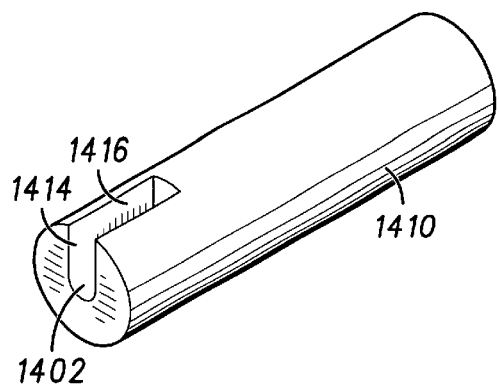
FIG. 15 shows an exemplary view of one coupling member.
Figure 16:
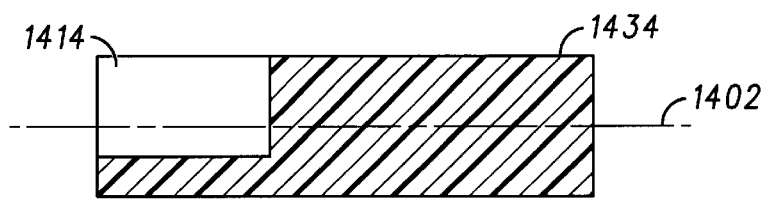
FIG. 16 shows an exemplary cross section of one coupling member.

Illustrated in FIG. 14, at least one retaining member pair is present in one exemplary embodiment to prevent rotation about a first axis 1402 while the two housing portions are rotating about a second axis 1404 that is perpendicular to the first axis 1402. The first housing portions 1434 and 1436 are separated for illustration purposes only. The retaining member pair comprises a first retaining portion 1406 and a second retaining portion 1408. The first retaining portion is a portion of the first housing portion 1434 or a portion coupled to the first housing portion 1434. In the exemplary embodiment, the first retaining portion 1406 is integral to the first housing portion 1434 and forms a tubular member 1410 extending laterally along a first side 1412 of the first housing portion 1436. The tubular member 1410 is centered about the first axis 1402. The first retaining portion 1406 comprises a notch 1414 creating a first opening 1416 or void in a sidewall 1418 of the tubular member 1410. This is also illustrated in FIG. 15 and FIG. 16 showing only the first retaining portion 1406 of the first housing portion 1434. FIG. 16 shows a cross section of the first retaining portion 1406. The first opening 1416 allows the retaining portion 1406 to receive the second retaining portion 1408 when the two housing portions are aligned in the proper relative position.

Figure 17:
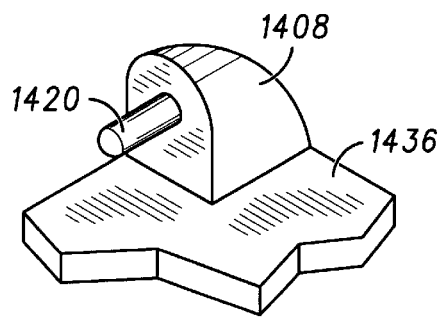
FIG. 17 shows an exemplary view of a second coupling member.
Figure 18:
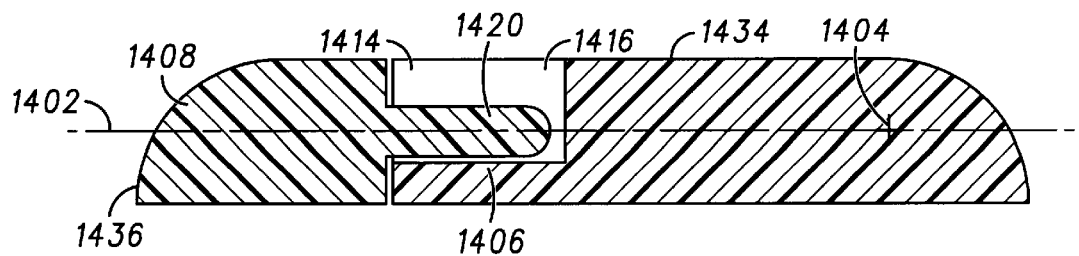
FIG. 18 shows an exemplary view of a first and second coupling member.
Figure 19:
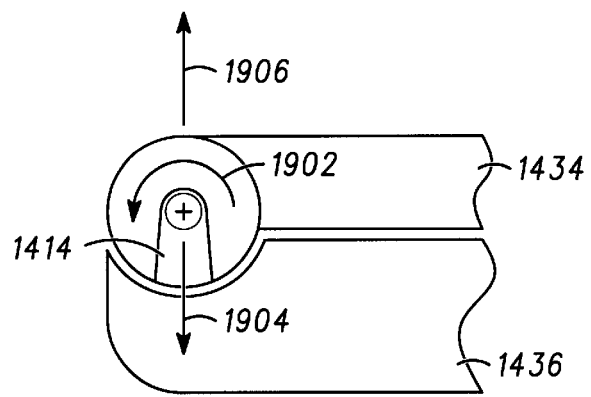
FIG. 19 shows an exemplary view of a first and second coupling member in a first position.
Figure 20:
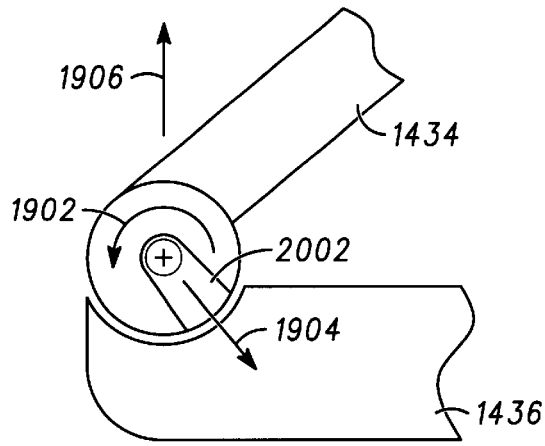
FIG. 20 shows an exemplary view of a first and second coupling member in a second rotation position.
Figure 21:
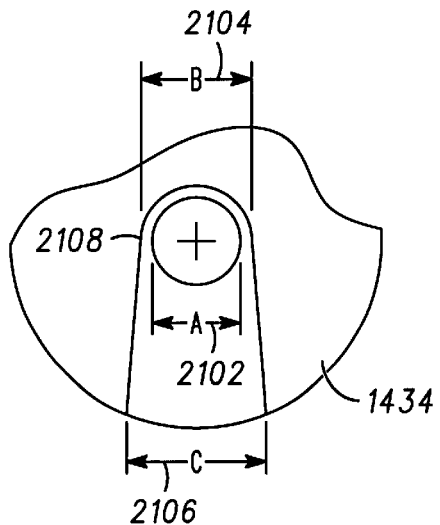
FIG. 21 shows an exemplary view of the notch.

The second retaining portion 1408, shown in FIGS. 14, 17 and 18, has a uniform portion 1420, which in the exemplary embodiment is a cylindrical shape, protrudes from the second housing portion 1436. In the exemplary embodiment the uniform portion 1420 is a pin 1420 that is received by the notch 1414 of the first retaining portion. The pin 1420 and the notch 1414, when engaged, run axially along the first axis 1402. When the first housing potion and the second housing portion rotate about the first axis 1402, and as illustrated by arrow 1902 in FIGS. 19 and 20, the pin 1420 also rotates axially within a portion of the notch 1414 about the first axis. The pin 1420 can be disengaged from the first retaining portion through the first opening 1416 only when the first opening 1416 and the plane of rotation of the second axis 1906 are aligned 1904, 1906 as shown in FIG. 19. When the first opening and the plane of the second axis are not aligned, as in FIG. 20 the notch 1414 and the first opening 1416 are angularly displaced from the plane of the second axis 1404, and therefore the pin 1420 is retained by the inner wall 2002 of the notch 1414. This can also be described such that when the opening 1416 of said notch 1414 and the second axis 1404 are on in parallel planes, the pin 1420 is engageable to the notch 1414 through the opening 1416 into the second retaining portion 1406. This is possible because the opening 1416 is substantially in the same or parallel plane as the second axis 1404. As the two housing portions rotate, the second axis 1404 and the opening 1416 angularly displace preventing the pin 1420 from disengaging from the first retaining portion 1406.

The notch 1414 has a portion wherein a first inner portion surface 2108 of the inner wall 2002 is substantially uniform and forms a reciprocal shape to that of said cylindrically shaped pin 1420 in the exemplary embodiment. This allows the pin 1420 to rotate smoothly within the notch 1414 as the two housings rotate about the first axis 1402. In the exemplary embodiment, the notch opening, illustrated by dimension "c" 2106, is shown larger than the first inner portion surface 2108 width shown as dimension "b" 2104, which is slightly larger than the diameter of the pin 1420 illustrated by dimension "a" 2102. This shape allows for smooth rotation of the pin 1420 when located in the first inner surface of 2108 the notch 1414 and the wider dimension "c" 2106 at the opening 1416 of the notch 1414 allows the pin 1420 to be easily engaged and disengaged, when the two housings rotate about the second axis 1404.

The device may have two sets of retaining members, which is further illustrated in FIG. 14. A third retaining portion 1422 and a fourth retaining member 1426. These two retaining portions are substantially the same shape and function as the first and second retain portions 1406 and 1408, however they are in different orientations and on the opposite housing. For example the second pin 1424 is on the first housing portion 1434, whereas the first pin 1420 is located on the second housing. The second pin 1424 is perpendicular to the first axis 1402, and the first pin 1420 is perpendicular to the second axis 1404. The second pin 1424 and the second notch 1428 and the second opening 1430 are aligned within the same plane or substantially parallel plane of the first axis of rotation 1402. This allows the pin 1424 to engage and disengage the notch 1428 through opening 1430 when the two housing portions rotate about the first axis 1402. When the housings rotate about the first axis 1404 the notch 1428 rotates and is angularly displaced from the plane of rotation associated with the first axis 1402 thereby locking the pin 1424 in the notch 1428 similarly to that described above.

FIG. 22 shows the device in an open position and rotated about the first axis 1404 such that the first housing portion 1434 and the second housing portion are angularly displaced. The second axis 1404 of rotation and the notch 1414, or notch receiving line are also angularly displaced preventing the pin 1420 from releasing from the notch 1414. In the exemplary embodiment, the second axis 1404 and the notch 1414 or notch receiving line, are at the same angle, or aligned when the two housing portions are planalry adjacent as shown in FIG. 23. From this position, the closed position, the device can open, rotating about the first axis 1402 indicated by arrow 2302 to the open position shown in FIG. 22 or by rotating about the second axis 1404, in a landscape orientation, shown by arrow 2304. In the latter, pin 1424 is locked or engaged with second notch 1428 as long as the plane of the first axis is angularly displaced form the angle of the notch or the angle of the plane of the second opening 1430 of the second notch 1428. The open position shown in FIG. 22 is similar to that of FIG. 4, which may be a radiotelephone mode or configuration. The landscape orientation is illustrated again by FIG. 8 and may be a text messaging, email or also a gaming mode for example.

While the invention has been described in detail above, the invention is not intended to be limited to the specific embodiments as described. It is evident that those skilled in the art may now make numerous uses and modifications of and departures from the specific embodiments described herein without departing from the inventive concepts.

We claim:

1. A portable electronic communication device, comprising:
   a first housing portion and a second housing portion;
   a hinge connecting said first housing portion and said second housing portion, said hinge allowing rotation of said first housing portion relative to said second housing portion about a first axis, and
   said hinge allowing rotation of said first housing portion relative to said second housing portion about a second axis perpendicular to said first axis;
   a first retaining portion protruding from said second housing portion, perpendicular to said second axis, and having a cylindrical shape; and
   a second retaining portion of said first housing portion having a first notch forming a first opening in said first housing portion, said first notch perpendicular to said second axis, and said first notch adapted to receive said first retaining portion when said first opening of said first notch is in a plane substantially parallel to a plane of said second axis.

2. The device of claim 1, wherein said notch retains said first retaining portion such that said first retaining portion is axially aligned with said first axis of rotation when said first housing portion rotates about said first axis relative to said second housing portion.

3. The device of claim 2, said notch having an inner portion surface, which is substantially uniform and forms a reciprocal shape to that of said cylindrically shaped first retaining portion.

4. The device of claim 1, said first retaining portion is disengageable from said second retaining portion when said first housing portion and said second housing portion are planarly adjacent.

5. The device of claim 4, said first retaining portion rotateably engaged to said second retaining portion when said opening of said notch and said second axis are on in parallel planes.

6. The device of claim 1,
a third retaining portion protruding from said first housing portion, perpendicular to said first axis, and having a cylindrical shape; and
a fourth retaining portion of said second housing portion having a second notch forming a second opening in said second housing portion, perpendicular to said first axis, and adapted to receive said third retaining portion when said second opening of said second notch is in a plane substantially parallel to the plane of said first axis.

7. The device of claim 6, wherein said hinge comprises an elbow joint;
a first hinge body coupled to a first end of said elbow, said first hinge body which rotates about said first axis relative to said elbow; and
a second hinge body coupled to a second end of said elbow, said second hinge body which rotates about said second axis relative to said elbow.

8. The device of claim 7, wherein said first hinge body is coupled to a first side of said first housing portion, and
said second hinge body is coupled to a first side of said second housing portion which is perpendicular to said first side of said first housing portion, and wherein
said elbow is adjacent to a first corner of said first side of said first housing portion and said first side of said second housing portion.

9. A portable electronic device comprising:
a first housing portion and a second housing portion;
a hinge coupling said first housing portion and said second housing portion, said hinge allowing said first housing portion to rotate about a first axis relative to said second housing and allowing said first housing portion to rotate about a second axis relative to said second housing portion;
a first cylindrical pin disposed at a first corner of said second housing portion protruding perpendicular to said second axis of rotation; and
a second notch in a corner of said first housing portion adapted to retain said pin when said first housing portion and said second housing portion rotate about said first axis, said notch having an opening adapted to receive said pin when said first housing portion and said second housing portion are in a first position.

10. The device of claim 9, a second cylindrical pin disposed at a second corner of said first housing portion protruding perpendicular to said first axis of rotation; and
a second notch in a second corner of said second housing portion adapted to retain said second pin when said first housing portion and said second housing portion rotate about said second axis, said second notch having a second opening adapted to receive said second pin when said first housing portion and said second housing portion are in said first position.

11. The device of claim 10, wherein said first corner of said first housing portion is opposite to said second corner of said housing portion, and
wherein said first corner of said second housing portion is opposite to said second corner of said second housing portion.

12. The device of claim 11, wherein said first notch radially aligns with a plane of rotation of said second axis, and wherein said second notch radially aligns with a plane of said first axis.

13. A handheld electronic device comprising:
a first housing portion;
a second housing portion;
a joint coupled to said first housing portion and said second housing portion comprising a dual axis hinge at a first corner of said first housing portion and a second corner of said second housing portion, allowing said first housing portion to rotate about a first axis and a second axis, perpendicular to said first axis, relative to said second housing portion,
wherein said joint comprises a first coupling member of said first housing and a second coupling member of said second housing adapted to receive said first coupling member, said first coupling member retained by said second coupling member in a first range of angular displacement about said first axis of said first housing and said second housing, and
wherein said first coupling member is disengageable from said second coupling member when said first housing and said second housing are not angularly displaced, and
wherein said joint comprises a third coupling member of said second housing and a fourth coupling member of said first housing adapted to receive said third coupling member, said third coupling member retained by said second coupling member in a second range of angular displacement about said second axis of said first housing and said second housing, and
wherein said third coupling member is disengageable from said fourth coupling member when said first housing and said second housing are not angularly displaced.

14. The device of claim 13, wherein the first coupling member is a first cylindrical pin and the second coupling member is a second cylindrical pin extending from said second housing portion.

15. The device of claim 14, wherein the dual axis hinge is at a corner adjacent to said first second third and fourth coupling members.

16. The device of claim 15, wherein the first coupling member is at an opposite corner of said first housing portion from said fourth coupling member, and
wherein the second coupling member is at an opposite corner of said second housing portion from said third coupling member.

17. The device of claim 13, wherein the dual axis hinge is at a corner adjacent to said first second third and fourth coupling members.

18. The device of claim 13, wherein the first coupling member is at an opposite corner of said first housing portion from said fourth coupling member, and
wherein the second coupling member is at an opposite corner of said second housing portion from said third coupling member.

* * * * *